H. B. KARLIN.
PACKING RING.
APPLICATION FILED APR. 3, 1911.

1,010,770.

Patented Dec. 5, 1911.

Witnesses:
Max B. A. Doring
Paul H. Frank

Inventor
Halfdan Birger Karlin
By his Attorneys
Marble & Matty

UNITED STATES PATENT OFFICE.

HALFDAN BIRGER KARLIN, OF STOCKHOLM, SWEDEN, ASSIGNOR TO DE LAVAL STEAM TURBINE COMPANY, OF NEW YORK, N. Y., A CORPORATION OF NEW JERSEY.

PACKING-RING.

1,010,770. Specification of Letters Patent. Patented Dec. 5, 1911.

Application filed April 3, 1911. Serial No. 618,541.

*To all whom it may concern:*

Be it known that I, HALFDAN BIRGER KARLIN, a subject of the King of Sweden, and a resident of Stockholm, Sweden, have invented certain new and useful Improvements in Packing-Rings, of which the following is a specification.

My invention relates to improvements in packing or tightening rings such as are employed for example between the rotors and stationary diaphragms of steam turbines and between the rotors and casings of blowers, centrifugal and other rotary pumps, and like machines; and the invention consists in a novel structure of said rings whereby increased heat-radiating surface is provided, and whereby expansion of the ring is permitted in a direction radially outward.

It is well known that, in use, packing or tightening rings such as referred to, when constructed in the ordinary manner, occasionally become over-heated through friction and acquire a permanent set which decreases the predetermined clearance. Such set is due to the fact that in rings as ordinarily constructed the metal is unable to expand diametrically, being held against such expansion by the diaphragm of the turbine or casing of the blower, pump, etc. The construction herein described provides increased radiating surface, thereby reducing liability to overheating, and further provides for the expansion of the ring in directions radially outward, thereby permitting the ring to expand freely with rise of temperature without acquiring permanent set.

I will now proceed to describe my invention with reference to the accompanying drawings, and will then point out the novel features in claims.

Figure 1:
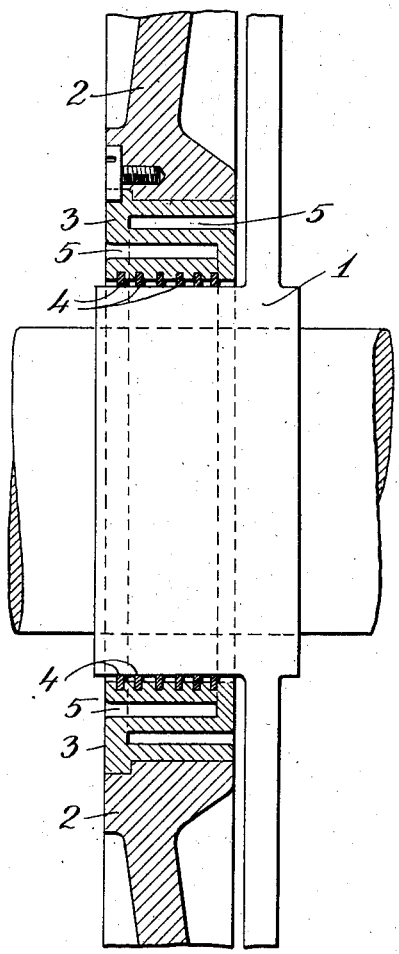
Figure 2:
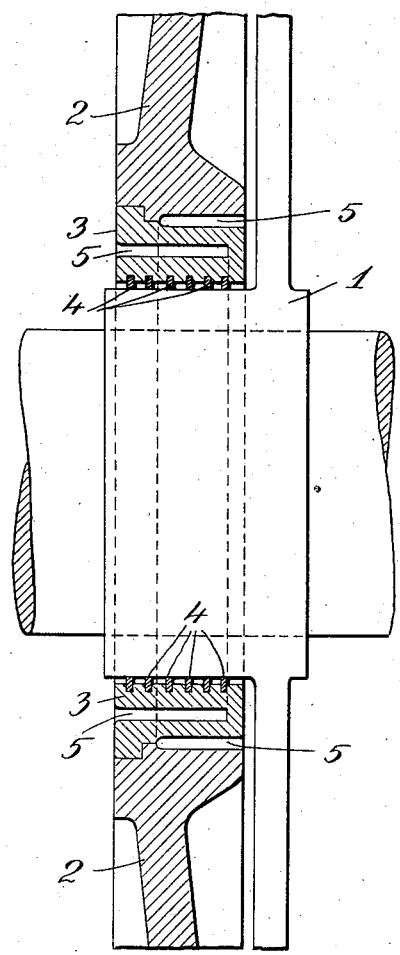

In the drawings: Figure 1 shows a detail transverse section of a portion of a turbine, and shows in section a packing or anti-leakage ring constructed in accordance with my invention; and Fig. 2 is a similar section showing an alternative form of ring.

Referring first to Fig. 1, 1 designates the rotor of the turbine, 2 one of the stationary diaphragms of the turbine and 3 a packing or anti-leakage or tightening ring, located, as is customary, between the diaphragm 2 and the rotor. I have shown the packing ring as provided with the customary rings 4 of anti-friction metal forming a surface of the ring 3 adapted for contact with the rotor 1.

As ordinarily constructed, packing rings such as ring 3 are solid rings and in case they become unduly heated through contact of the rotor with said packing ring, they acquire a permanent set for the reason previously stated. According to my invention, however, I construct said rings with grooves 5 extending longitudinally inward from the outer surface of the ring. In the construction shown in Fig. 1, two such grooves are shown, one extending from the right hand side of the ring inward, the other from the left hand side of the ring inward. In the similar construction shown in Fig. 2, one of these grooves is between a portion of the outer surface of the ring 3 and the diaphragm 2. Obviously there may be as few or as many of these grooves 5 as conditions render desirable. The ring 3 may be formed as a complete ring in one piece, or may be formed of a plurality of segments.

By the construction shown I provide a packing ring with a very large heat radiating surface. Furthermore, the grooves 5 permit free expansion of the ring without decrease in diameter thereof, thereby avoiding such expansion of the ring as will result in its acquiring a permanent set.

What I claim is:—

1. A packing or anti-leakage ring such as described, provided with a plurality of grooves extending inward from opposite lateral faces of the ring.

2. The combination in a rotary machine such as referred to, with two members, one of which is rotatable with respect to the other, of an anti-leakage ring between said members, and secured to one of said members, and provided with a plurality of inwardly extending grooves of different radii, extending inward from opposite lateral faces of said ring and overlapping.

3. The combination in a rotary machine such as referred to, with two members, one of which is rotatable with respect to the other, of an anti-leakage ring between said members, and centered with respect to one of said members, and provided with a plurality of inwardly extending grooves of different radii, extending inward from opposite lateral faces of said ring and overlapping.

In testimony whereof I have signed this specification in the presence of two subscribing witnesses.

HALFDAN BIRGER KARLIN.

Witnesses:
WALDEMAR BOMAN,
T. EKEBOHM.

Copies of this patent may be obtained for five cents each, by addressing the "Commissioner of Patents, Washington, D. C."